US012492502B2

(12) United States Patent
Yamada et al.

(10) Patent No.: US 12,492,502 B2
(45) Date of Patent: Dec. 9, 2025

(54) DRYING TIME PREDICTION METHOD, DRYING TIME PREDICTION SYSTEM, AND DRYER

(71) Applicant: Panasonic Intellectual Property Management Co., Ltd., Osaka (JP)

(72) Inventors: Tatsuro Yamada, Osaka (JP); Chieko Sasaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 922 days.

(21) Appl. No.: 17/641,664

(22) PCT Filed: Jun. 29, 2021

(86) PCT No.: PCT/JP2021/024637
§ 371 (c)(1),
(2) Date: Mar. 9, 2022

(87) PCT Pub. No.: WO2022/180881
PCT Pub. Date: Sep. 1, 2022

(65) Prior Publication Data
US 2023/0151524 A1    May 18, 2023

(30) Foreign Application Priority Data
Feb. 25, 2021   (JP) ................ 2021-028731

(51) Int. Cl.
*D06F 34/06*   (2020.01)
*D06F 34/28*   (2020.01)
(Continued)

(52) U.S. Cl.
CPC .............. *D06F 34/06* (2020.02); *D06F 34/28* (2020.02); *D06F 58/38* (2020.02); *D06F 58/46* (2020.02);
(Continued)

(58) Field of Classification Search
CPC .......... D06F 34/06; D06F 34/28; D06F 58/38; D06F 58/46; D06F 2101/04;
(Continued)

(56) References Cited

U.S. PATENT DOCUMENTS

2004/0200093 A1* 10/2004 Wunderlin .............. D06F 34/08
34/606
2019/0257021 A1* 8/2019 Ahn ........................ D06F 33/44
(Continued)

FOREIGN PATENT DOCUMENTS

| CN | 108193461 A | * | 6/2018 | ............. D06F 58/30 |
| JP | 2014-085914 A | | 5/2014 | |
| JP | 2020-013581 A | | 1/2020 | |

OTHER PUBLICATIONS

Translation CN-108193461-A (Year: 2018).*
International Search Report issued on Sep. 14, 2021 in International Patent Application No. PCT/JP2021/024637.

*Primary Examiner* — Jessica Yuen
(74) *Attorney, Agent, or Firm* — Rimon P.C.

(57) ABSTRACT

A drying time prediction method includes: obtaining an operation condition set at the start of operation of a first dryer; obtaining the first actual operation time period of each of at least one first operation performed by the first dryer; obtaining operation finish time information from a learned model by inputting, to the learned model, the operation condition and first actual information that is based on the first actual operation time period, the operation finish time information being related to the finish time of the operation started under the operation condition; and outputting first information based on the operation finish time information.

9 Claims, 7 Drawing Sheets

(51) Int. Cl.
    *D06F 58/38*     (2020.01)
    *D06F 58/46*     (2020.01)
    *D06F 101/04*     (2020.01)
    *D06F 101/20*     (2020.01)
    *D06F 105/56*     (2020.01)

(52) U.S. Cl.
    CPC ...... *D06F 2101/04* (2020.02); *D06F 2101/20* (2020.02); *D06F 2105/56* (2020.02)

(58) Field of Classification Search
    CPC .. D06F 2101/20; D06F 2105/56; D06F 34/04; D06F 2103/38
    See application file for complete search history.

(56) References Cited

U.S. PATENT DOCUMENTS

2020/0002873 A1     1/2020    Chae et al.
2020/0087847 A1     3/2020    Choung et al.

\* cited by examiner

DRYING TIME PREDICTION METHOD, DRYING TIME PREDICTION SYSTEM, AND DRYER

CROSS-REFERENCE OF RELATED APPLICATIONS

This application is the U.S. National Phase under 35 U.S.C. § 371 of International Patent Application No. PCT/JP2021/024637, filed on Jun. 29, 2021, which in turn claims the benefit of Japanese Application No. 2021-028731, filed on Feb. 25, 2021, the entire disclosures of which Applications are incorporated by reference herein.

TECHNICAL FIELD

The present disclosure relates to drying time prediction.

BACKGROUND ART

There are known techniques for making a prediction about a future event (see Patent Literature 1 (PTL 1), for example).

CITATION LIST

Patent Literature

[PTL 1] Japanese Unexamined Patent Application Publication No. 2014-85914

SUMMARY OF INVENTION

Technical Problem

It is desirable to display the remaining drying time of a drying operation to a user who uses a dryer or other equipment to dry clothes and other items.

Thus, the present disclosure aims to provide, for example, a drying time prediction method.

Solution to Problem

A drying time prediction method according to one aspect of the present disclosure includes: obtaining an operation condition set at the start of operation of a first dryer; obtaining the first actual operation time period of each of at least one first operation performed by the first dryer; obtaining operation finish time information from a learned model by inputting, to the learned model, the operation condition and first actual information that is based on the first actual operation time period, the operation finish time information being related to the finish time of the operation started under the operation condition; and outputting first information based on the operation finish time information.

A drying time prediction system according to another aspect of the present disclosure includes: an operation condition obtainment unit that obtains an operation condition set at the start of operation of a first dryer; a first actual operation time period obtainment unit that obtains the first actual operation time period of each of at least one first operation performed by the first dryer; a learned model that outputs operation finish time information in response to input of the operation condition and first actual information that is based on the first actual operation time period, the operation finish time information being related to the finish time of the operation started under the operation condition; and an outputting unit that outputs first information based on the operation finish time information.

A dryer according to still another aspect of the present disclosure is the first dryer using the preceding drying time prediction system. The dryer includes: a provision unit that provides the drying time prediction system with the operation condition, the sensing information, and the first actual operation time period; an obtainment unit that obtains the first information from the drying time prediction system; and a display that displays information on the first information.

Advantageous Effects of Invention

It is possible to predict drying time by using the drying time prediction method, the drying time prediction system, or the dryer according to one aspect of the present disclosure.

DESCRIPTION OF EMBODIMENT (Background that Led to Obtainment of One Aspect of the Present Disclosure)

In conventional methods, when a dryer or other equipment displays the remaining drying time of a drying operation, remaining drying time obtained by adding a correction value to a default value preset for each amount of fabrics is displayed at the start of the drying operation, and then a countdown of the remaining drying time that decreases with elapse of time starts.

In addition, in conventional methods, to accurately display remaining drying time, the degree of dryness is determined at each fixed point (e.g., every 10 minutes) during a drying cycle by using sensing information on the state of the dryer, and the displayed remaining drying time is adjusted according to the determination result.

Figure 1:
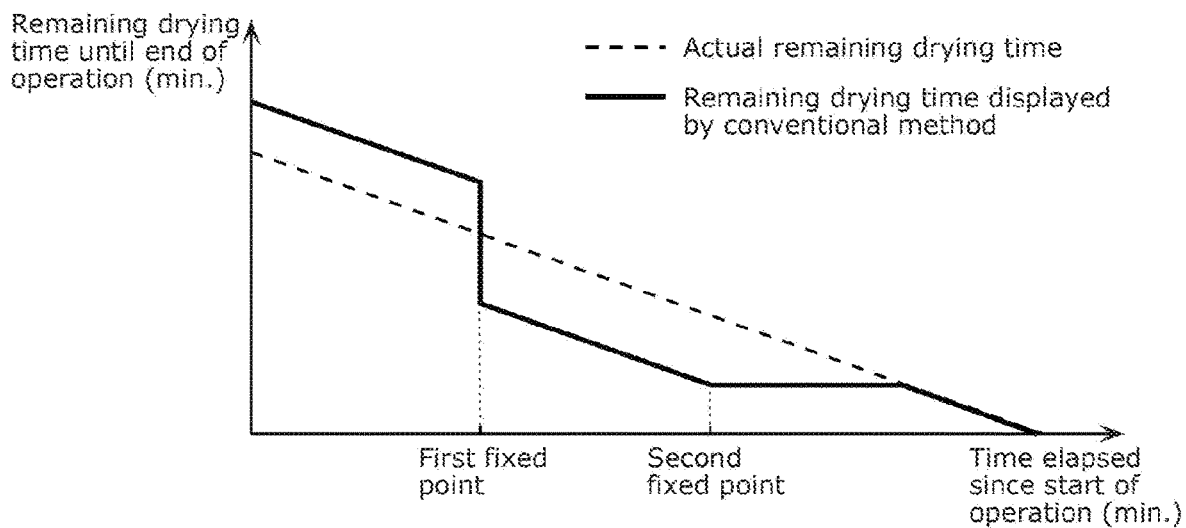
FIG. 1 schematically illustrates a relationship between remaining drying time displayed by a conventional method and actual remaining drying time.

FIG. 1 schematically illustrates a relationship between remaining drying time displayed by a conventional method and actual remaining drying time.

As illustrated in FIG. 1, if remaining drying time is displayed by a conventional method, there are, for example, a phenomenon in which the displayed remaining drying time discontinuously changes and a phenomenon in which a countdown of the displayed remaining drying time stops for a certain period of time. The occurrence of such phenomena may confuse a user who looks at the displayed remaining drying time.

In view of the foregoing, the inventors of the present disclosure conducted diligent experiments and analysis to obtain, for example, a drying time prediction method capable of predicting drying time more accurately than conventional methods. Through their efforts, the inventors identified that it is possible to predict drying time more accurately than conventional methods by using a learned model pre-trained to output remaining drying time in response to input of operation conditions set at the start of operation of a dryer or other equipment, sensing information on the state of the dryer performing an operation started under the operation conditions, and the actual operation time periods of past operations performed by the dryer.

Figure 2:
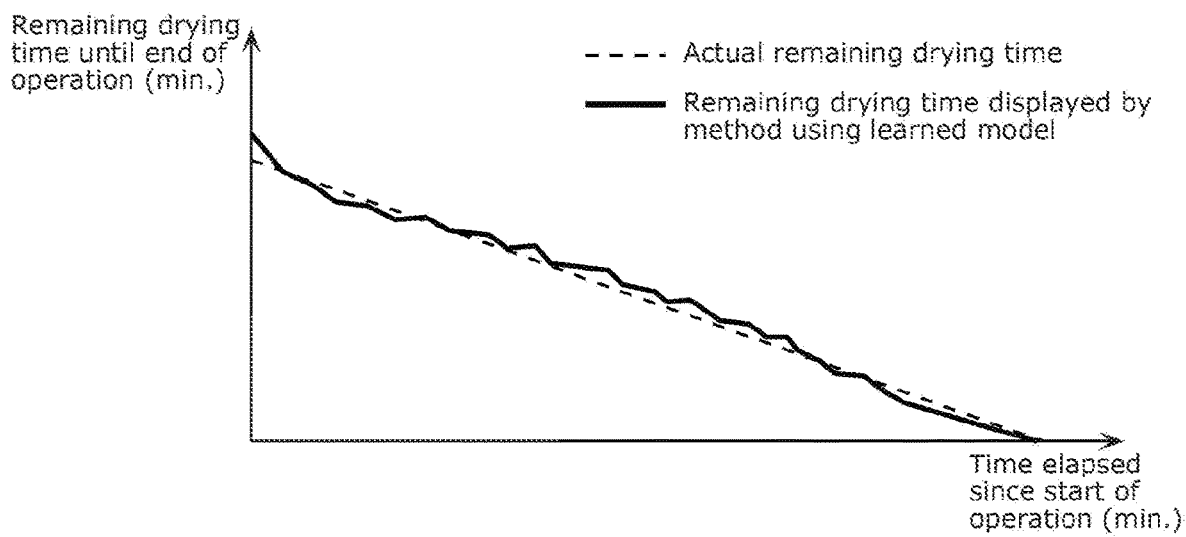
FIG. 2 schematically illustrates a relationship between remaining drying time displayed by a method using a learned model and actual remaining drying time.

FIG. 2 schematically illustrates a relationship between remaining drying time displayed by a method using the learned model and actual remaining drying time.

As it is known from FIGS. 1 and 2, drying time prediction by a method using the learned model enables more accurate display of remaining drying time than conventional methods.

The inventors conducted further diligent experiments and analysis on the basis of the findings and arrived at the creation of the drying time prediction method, the drying time prediction system, and the dryer described below.

A drying time prediction method according to one aspect of the present disclosure includes: obtaining an operation condition set at the start of operation of a first dryer; obtaining the first actual operation time period of each of at least one first operation performed by the first dryer; obtaining operation finish time information from a learned model by inputting, to the learned model, the operation condition and first actual information that is based on the first actual operation time period, the operation finish time information being related to the finish time of the operation started under the operation condition; and outputting first information based on the operation finish time information.

In the preceding drying time prediction method, it is possible to predict drying time by using the learned model pre-trained to output an operation finish time in response to input of operation conditions set at the start of operation of the first dryer and the first actual operation time period of each past operation performed by the first dryer, the operation finish time being the operation finish time of the operation started under the operation conditions.

In addition, the drying time prediction method may further include obtaining sensing information on the state of the first dryer performing the operation started under the operation condition. The obtaining of the operation finish time information may include obtaining the operation finish time information from the learned model by inputting the sensing information to the learned model in addition to the operation condition and the first actual information.

Thus, the operation finish time information output by the learned model also reflects the sensing information. This enables more accurate drying time prediction.

In addition, the drying time prediction method may further include obtaining, for each of the at least one first operation, a first actual operation condition set at the start of the first operation, the first actual operation condition being associated with the first actual operation time period of the first operation; obtaining, for each of at least one second operation that has been performed by at least one second dryer, a second actual operation time period of the second operation and a second actual operation condition set at the start of the second operation, the second actual operation condition being associated with the second actual operation time period of the second operation; and calculating a standardized actual operation time period for each of at least one first actual operation time period obtained in the obtaining of the first actual operation time period, by standardizing each of the at least one first actual operation time period according to the distribution of at least one second actual operation time period associated with the second actual operation condition corresponding to the first actual operation condition associated with the first actual operation time period, the at least one second actual operation time period being included in at least one second actual operation time period of the at least one second operation. The first actual information may be based on at least one standardized actual operation time period calculated for the at least one first actual operation time period in the calculating.

Thus, each standardized actual operation time period reflects whether the drying time period of a past operation performed by the first dryer tends to be longer or shorter when seen in the distribution of the drying time period(s) of past operation(s) performed by the at least one second dryer under the corresponding operation condition. This enables more accurate drying time prediction.

In addition, the drying time prediction method may further include calculating the mean value of the at least one standardized actual operation time period calculated for the at least one first actual operation time period. The first actual information may be based on the mean value.

Thus, the mean value reflects whether past operations performed under all the actual operation conditions tend to take longer or shorter. This enables predicted drying time to reflect whether the past operations performed under all the actual operation conditions tend to take longer or shorter.

In addition, the first operation may be an operation performed by the first dryer during a past predetermined period, and the second operation may be an operation performed by the at least one second dryer during the past predetermined period.

The types of items put in a dryer tend not to change significantly for a certain period. This enables more accurate drying time prediction.

In addition, the operation condition and the first actual operation condition may each include the fabric amount of items put in the first dryer and the operation program of the first dryer that have been set by the user of the first dryer. The second actual operation condition may each include the fabric amount of items put in each of the at least one second dryer and the operation program of the second dryer that have been set by the user of the second dryer.

Thus, it is possible to predict drying time according to the fabric amount of items put in the dryer and the operation program of the dryer that have been set by the user.

In addition, the first dryer and the at least one second dryer may be the same type of dryers.

This enables more accurate drying time prediction.

A drying time prediction system according to another aspect of the present disclosure includes: an operation condition obtainment unit that obtains an operation condition set at the start of operation of a first dryer; a first actual operation time period obtainment unit that obtains the first actual operation time period of each of at least one first operation performed by the first dryer; a learned model that outputs operation finish time information in response to input of the operation condition and first actual information that is based on the first actual operation time period, the operation finish time information being related to the finish time of the operation started under the operation condition; and an outputting unit that outputs first information based on the operation finish time information.

The preceding drying time prediction system can predict drying time by using the learned model pre-trained to output an operation finish time in response to input of operation conditions set at the start of operation of the first dryer and the first actual operation time period of each past operation performed by the first dryer, the operation finish time being the operation finish time of the operation started under the operation conditions.

A dryer according to still another aspect of the present disclosure is the first dryer using the drying time prediction system. The dryer includes: a provision unit that provides the drying time prediction system with the operation condition and the first actual operation time period; an obtainment unit that obtains the first information from the drying time prediction system; and a display that displays information on the first information.

The preceding dryer obtains the first information from the drying time prediction system, which enables drying time predication.

Hereinafter, specific examples of a drying time prediction method, a drying time prediction system, and a dryer according to some aspects of the present disclosure are described with reference to the drawings. The embodiment described herein represents a specific example of the present disclosure. Thus, for instance, the numerical values, shapes, structural elements, arrangements and connections of the structural elements, steps, and order of the steps described in the embodiment below are mere examples and are not intended to limit the present disclosure. In addition, the drawings are schematic diagrams and are not necessarily precisely drawn.

It should be noted that general and specific aspects of the present disclosure may be embodied as a system, a method, an integrated circuit, a computer program, or a computer-readable recording medium, such as a CD-ROM, or any combination of the system, method, integrated circuit, computer program, and recording medium.

Embodiment

[1. Configuration]

Figure 3:
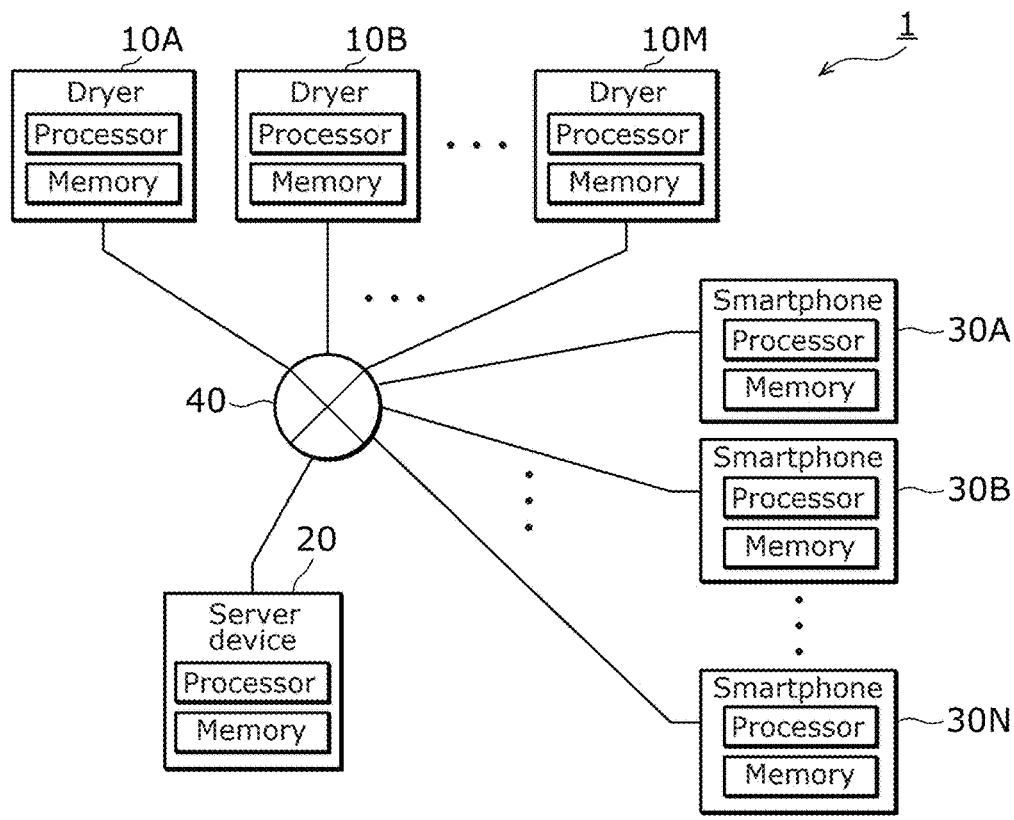
FIG. 3 is a block diagram illustrating a configuration example of a drying time prediction system according to an embodiment.

FIG. 3 is a block diagram illustrating a configuration example of a drying time prediction system according to an embodiment.

As illustrated in FIG. 3, drying time prediction system 1 according to the embodiment includes dryers 10, server device 20, smartphones 30, and network 40.

In FIG. 3, dryer 10A, dryer 10B, dryer 10M, and other dryers correspond to dryers 10. Hereinafter, unless the individual dryers have to be explicitly differentiated, each of dryer 10A, dryer 10B, dryer 10M, and the other dryers is simply referred to as dryer 10. Although dryers 10 described herein are the same type of dryers, dryers 10 do not necessarily have to be the same type of dryers.

In FIG. 3, smartphone 30A, smartphone 30B, smartphone 30N, and other smartphones correspond to smartphones 30. Hereinafter, unless the individual smartphones have to be explicitly differentiated, each of smartphone 30A, smartphone 30B, smartphone 30N, and the other smartphones is simply referred to as smartphone 30.

Network 40 relays communication between connected devices. The devices connected to network 40 include dryers 10, server device 20, and smartphones 30.

Network 40 may be, for example, the Internet, a cellular network, or a local area network (LAN).

Figure 4:
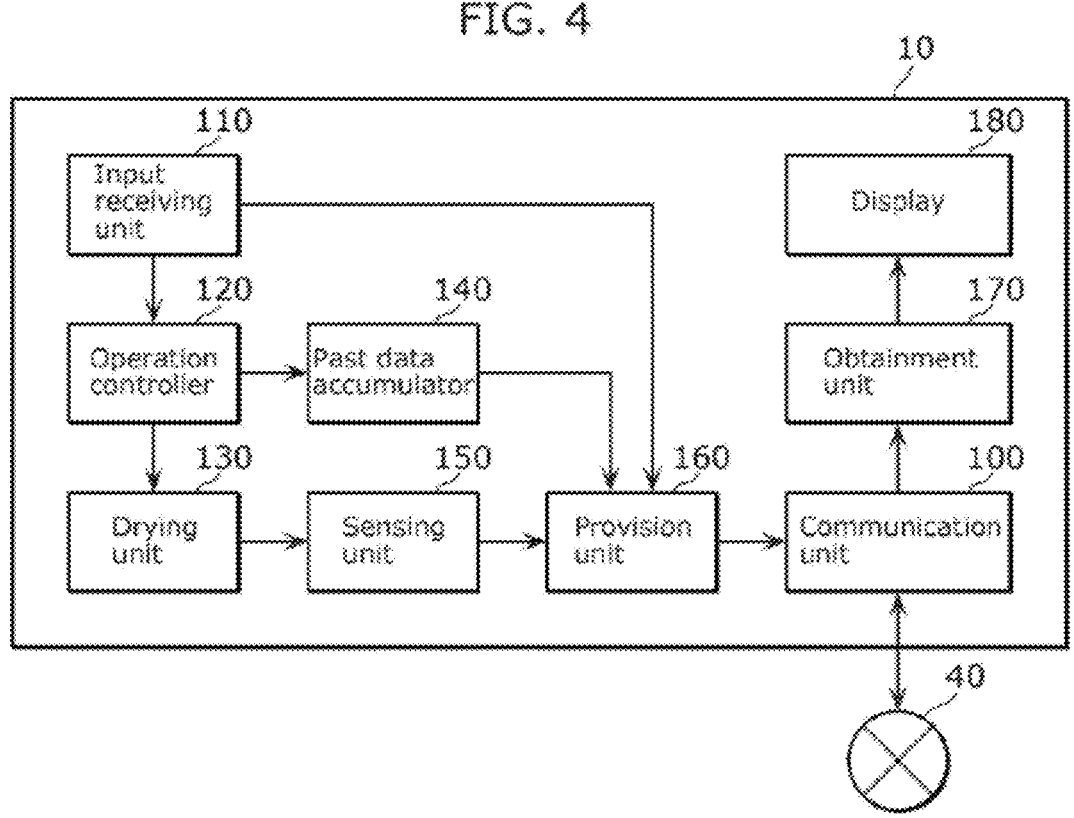
FIG. 4 is a block diagram illustrating a configuration example of a dryer according to the embodiment.

FIG. 4 is a block diagram illustrating a configuration example of dryer 10.

Dryer 10 is connected to network 40 and has the function of drying clothes and other items. Dryer 10 may be, for example, a washer-dryer also having the function of washing clothes and other items.

As illustrated in FIG. 4, dryer 10 includes communication unit 100, input receiving unit 110, operation controller 120, drying unit 130, past data accumulator 140, sensing unit 150, provision unit 160, obtainment unit 170, and display 180.

Communication unit 100 is connected to network 40 and communicates with external devices connected to network 40, via network 40. The external devices include server device 20 and smartphones 30.

For instance, communication unit 100 includes an input-output interface (not illustrated) and is caused to function by the processor (not illustrated) of dryer 10 running one or more programs stored in the memory (not illustrated) of dryer 10 to control the input-output interface.

Drying unit 130 includes a drying chamber (not illustrated) and dries clothes and other items put in the drying chamber.

Drying unit 130 includes, for example, a tumble-drying drum (not illustrated), a heater (not illustrated), and a fan (not illustrated) and dries clothes and other items put in the tumble-drying drum in the following manner: the clothes and other items put in are agitated by spinning the tumble-drying drum, and at the same time, the air warmed by the heater is sent to the tumble-drying drum by using the fan Drying unit 130 further includes sensors that sense the state of the drying chamber and/or the state of the clothes and other items put in the drying chamber. The sensors include, for example, a thermometer for sensing the outlet temperature of the air sent to the drying chamber, a thermometer for sensing the inlet temperature of the air sent to the outside of the drying chamber, an angular velocity meter for sensing the spin speed of the drying chamber, an accelerometer for sensing weight unbalance within the drying chamber, and a motor ammeter for sensing the fabric amount of clothes and other items put in the drying chamber.

Input receiving unit 110 receives input from the user of dryer 10. The input received by input receiving unit 110 includes operation conditions at the start of operation of dryer 10. The operation conditions include, for example, the fabric amount of clothes and other items put in dryer 10 and an operation program to operate dryer 10. It should be noted that in the description herein, input receiving unit 110 receives the amount of fabrics from the user. However, for instance, input receiving unit 110 may receive the amount of fabrics obtained by sensing unit 150 from sensing unit 150, which is described later.

For instance, input receiving unit 110 includes a touch panel (not illustrated) and is caused to function by the processor of dryer 10 running one or more programs stored in the memory of dryer 10 to control the touch panel.

Operation controller 120 operates dryer 10 by controlling the operation of drying unit 130 on the basis of the input received by input receiving unit 110.

For instance, operation controller 120 is caused to function by the processor of dryer 10 running one or more programs stored in the memory of dryer 10.

For each of past operations performed by dryer 10, past data accumulator 140 stores actual operation conditions and an actual operation time period associated with each other.

For instance, past data accumulator 140 includes a hard disk (not illustrated) and is caused to function by the processor of dryer 10 running one or more programs stored in the memory of dryer 10 to control the hard disk.

Sensing unit 150 controls the sensors of drying unit 130 to obtain sensing information on the state of dryer 10 in operation. The sensing information includes, for example, an outlet temperature, an inlet temperature, the spin speed of the drying chamber, and weight unbalance within the drying chamber. In addition, at the start of operation of dryer 10, sensing unit 150 may obtain the fabric amount of clothes and other items put in the drying chamber by controlling the sensors of drying unit 130.

Sensing unit 150 repeatedly obtains the sensing information during the operation of dryer 10. For instance, sensing unit 150 obtains the sensing information each minute during the period from the start of the operation of dryer 10 until the end of the operation.

For instance, sensing unit 150 is caused to function by the processor of dryer 10 running one or more programs stored in the memory of dryer 10.

Provision unit 160 provides server device 20 with the operation conditions received by input receiving unit 110, pairs each including actual operation conditions and an actual operation time period associated with each other that are stored in past data accumulator 140, and the sensing information obtained by sensing unit 150, via communication unit 100. More specifically, every time input receiving unit 110 receives operation conditions, provision unit 160 provides server device 20 with the operation conditions. Every time past data accumulator 140 updates the pairs each including actual operation information and an actual operation time period associated with each other, provision unit 160 transmits the updated pairs each including actual operation information and an actual operation time period associated with each other to server device 20. Every time sensing unit 150 obtains sensing information, provision unit 160 provides server device 20 with the sensing information.

For instance, provision unit 160 is caused to function by the processor of dryer 10 running one or more programs stored in the memory of dryer 10.

Obtainment unit 170 obtains first information (described later) indicating remaining drying time from server device 20 via communication unit 100. More specifically, every time server device 20 transmits first information, obtainment unit 170 obtains the first information.

For instance, obtainment unit 170 is caused to function by the processor of dryer 10 running one or more programs stored in the memory of dryer 10.

Display 180 displays information on the first information obtained by obtainment unit 170. More specifically, every time obtainment unit 170 obtains first information, display 180 displays remaining drying time indicated by the first information.

For instance, display 180 includes a touch panel (not illustrated) and is caused to function by the processor of dryer 10 running one or more programs stored in the memory of dryer 10 to control the touch panel.

Figure 5:
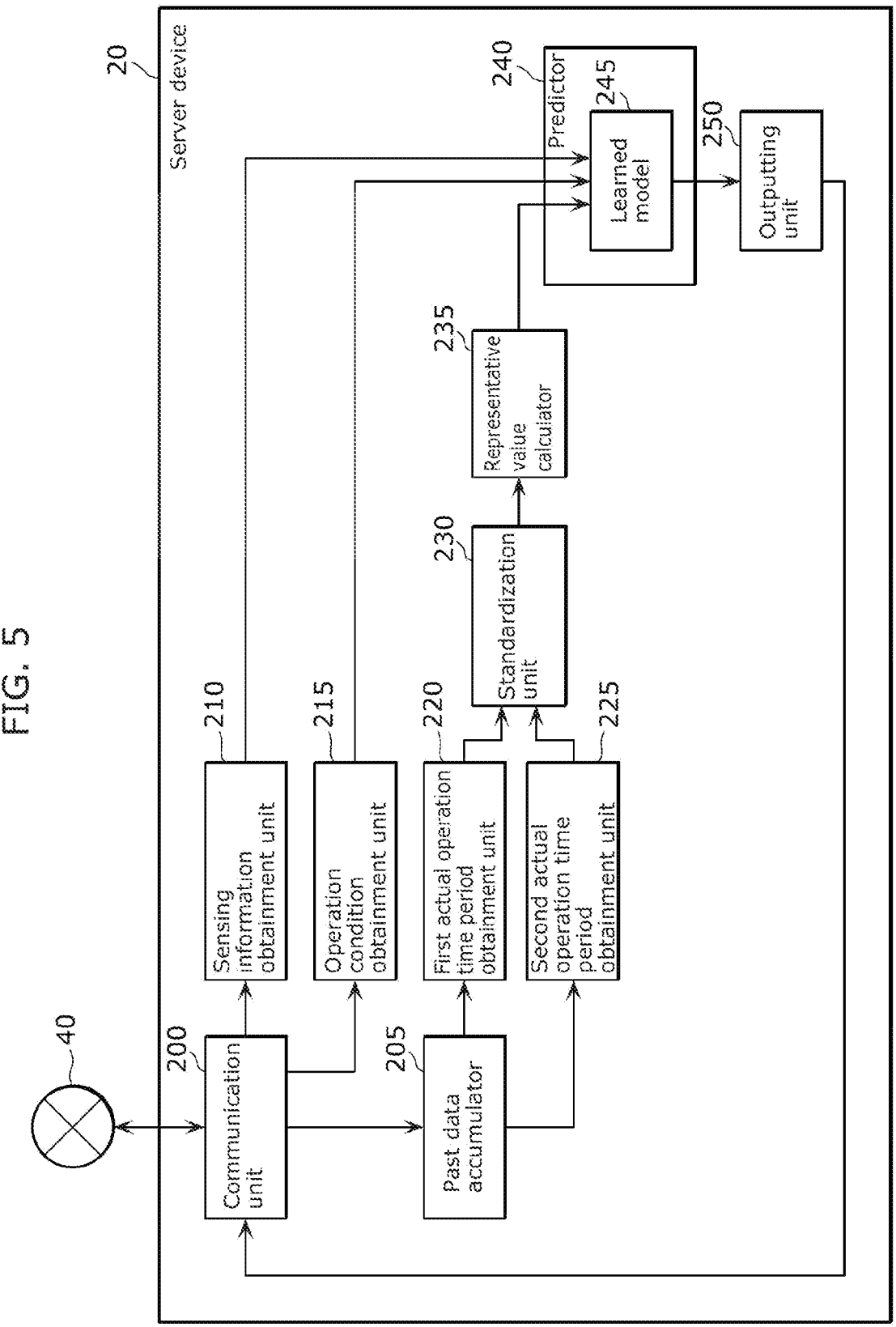
FIG. 5 is a block diagram illustrating a configuration example of a server device according to the embodiment.

FIG. 5 is a block diagram illustrating a configuration example of server device 20.

Server device 20 is connected to network 40 and has the function of predicting the remaining drying time of an operation being performed by dryer 10 to dry clothes and other items.

As illustrated in FIG. 5, server device 20 includes communication unit 200, past data accumulator 205, sensing information obtainment unit 210, operation condition obtainment unit 215, first actual operation time period obtainment unit 220, second actual operation time period obtainment unit 225, standardization unit 230, representative value calculator 235, predictor 240, and outputting unit 250. Here, predictor 240 includes learned model 245.

Communication unit 200 is connected to network 40 and communicates with external devices connected to network 40, via network 40. The external devices include dryers 10 and smartphones 30.

For instance, communication unit 200 includes an input-output interface (not illustrated) and is caused to function by the processor (not illustrated) of server device 20 running one or more programs stored in the memory (not illustrated) of server device 20 to control the input-output interface.

Sensing information obtainment unit 210 obtains sensing information from provision unit 160 via communication unit 200. Every time provision unit 160 provides sensing information, sensing information obtainment unit 210 obtains the sensing information.

For instance, sensing information obtainment unit 210 is caused to function by the processor of server device 20 running one or more programs stored in the memory of server device 20.

Operation condition obtainment unit 215 obtains operation conditions from provision unit 160 via communication unit 200. Every time provision unit 160 provides operation conditions, operation condition obtainment unit 215 obtains the operation conditions.

For instance, operation condition obtainment unit 215 is caused to function by the processor of server device 20 running one or more programs stored in the memory of server device 20.

Past data accumulator 205 obtains actual operation conditions and an actual operation time period associated with each other from provision unit 160 via communication unit 200 and stores the actual operation conditions and the actual operation time period associated with each other. Every time provision unit 160 provides actual operation conditions and an actual operation time period associated with each other, past data accumulator 205 obtains and stores the actual operation conditions and the actual operation time period associated with each other.

That is, for each of past operations performed by all dryers 10 included in drying time prediction system 1, past data accumulator 205 stores actual operation conditions and an actual operation time period associated with each other.

For instance, past data accumulator 205 includes a hard disk (not illustrated) and is caused to function by the processor of server device 20 running one or more programs stored in the memory of server device 20 to control the hard disk.

For each of past operations performed by dryer 10 (hereinafter, also referred to as first dryer 10) during a past predetermined period, first actual operation time period obtainment unit 220 obtains actual operation conditions (hereinafter, also referred to as first actual operation conditions) and an actual operation time period (hereinafter, also referred to as a first actual operation time period) associated with each other from among pairs each including actual operation conditions and an actual operation time period associated with each other that are stored in past data accumulator 205.

Here, the predetermined period may be from the date and time a predetermined number of days ago up to now or may be the same season as the current season (for instance, if it is April now, since April is spring, the predetermined period may be current and past spring (for instance, March, April, and May). That is, the predetermined period may be a period during which the types of items put in dryer 10 tend not to change significantly.

For instance, first actual operation time period obtainment unit 220 is caused to function by the processor of server device 20 running one or more programs stored in the memory of server device 20.

For each past operation performed by at least any one of dryers 10 (hereinafter, also referred to as at least one second dryer 10), second actual operation time period obtainment unit 225 obtains actual operation conditions (hereinafter, also referred to as second actual operation conditions) and an actual operation time period (hereinafter, also referred to as a second actual operation time period) associated with each other from among the pairs each including actual operation conditions and an actual operation time period associated with each other that are stored in past data accumulator 205. In the description herein, at least one second dryer 10 includes first dryer 10, that is, at least one second dryer 10 includes all dryers 10. However, at least one second dryer 10 does not have to include first dryer 10.

For instance, second actual operation time period obtainment unit 225 is caused to function by the processor of server device 20 running one or more programs stored in the memory of server device 20.

Standardization unit 230 calculates a standardized actual operation time period for each first actual operation time period by standardizing each first actual operation time period according to the distribution of at least one second actual operation time period associated with second actual operation conditions corresponding to first actual operation conditions associated with the first actual operation time period.

Here, standardization unit 230 calculates a standardized actual operation time period for each first actual operation time period, using Expression 1 described below. However, calculation does not necessarily have to be limited to the following example.

$$n=(t-\mathrm{mean}(Tc))/\mathrm{std}(Tc) \quad \text{(Expression 1)}$$

In Expression 1, n denotes a standardized actual operation time period, t denotes a first actual operation time period, Tc denotes a set of second actual operation time periods associated with second operation conditions corresponding to first operation conditions associated with the first actual operation time period, mean (Tc) denotes the mean value of all the second actual operation time periods included in set Tc, and std (Tc) denotes the variance of all the second actual operation time periods included in set Tc. Here, all the second actual operation time periods included in set Tc may be one second actual operation time period.

As described in Expression 1, if the first actual operation time period is identical to mean (Tc), that is, the mean value of the actual operation time periods of operations performed by all dryers 10 under the corresponding actual operation conditions, the value of the standardized actual operation time period is zero.

In addition, if the first actual operation time period is greater than mean (Tc), that is, the mean value of the actual operation time periods of the operations performed by all dryers 10 under the corresponding actual operation conditions, the first actual operation time period tends to be longer than the actual operation time periods of the operations performed by all dryers 10 under the corresponding actual operation conditions. In this case, the value of the standardized actual operation time period is a positive value.

In addition, if the first actual operation time period is smaller than mean (Tc), that is, the mean value of the actual operation time periods of the operations performed by all dryers 10 under the corresponding actual operation conditions, the first actual operation time period tends to be shorter than the actual operation time periods of the operations performed by all dryers 10 under the corresponding actual operation conditions. In this case, the value of the standardized actual operation time period is a negative value.

Thus, the standardized actual operation time period calculated by standardization unit 230 reflects whether the first actual operation time period tends to be longer or shorter when seen in the distribution of at least one second actual operation time period associated with second actual operation conditions corresponding to first actual operation conditions associated with the first actual operation time period.

Figure 6:
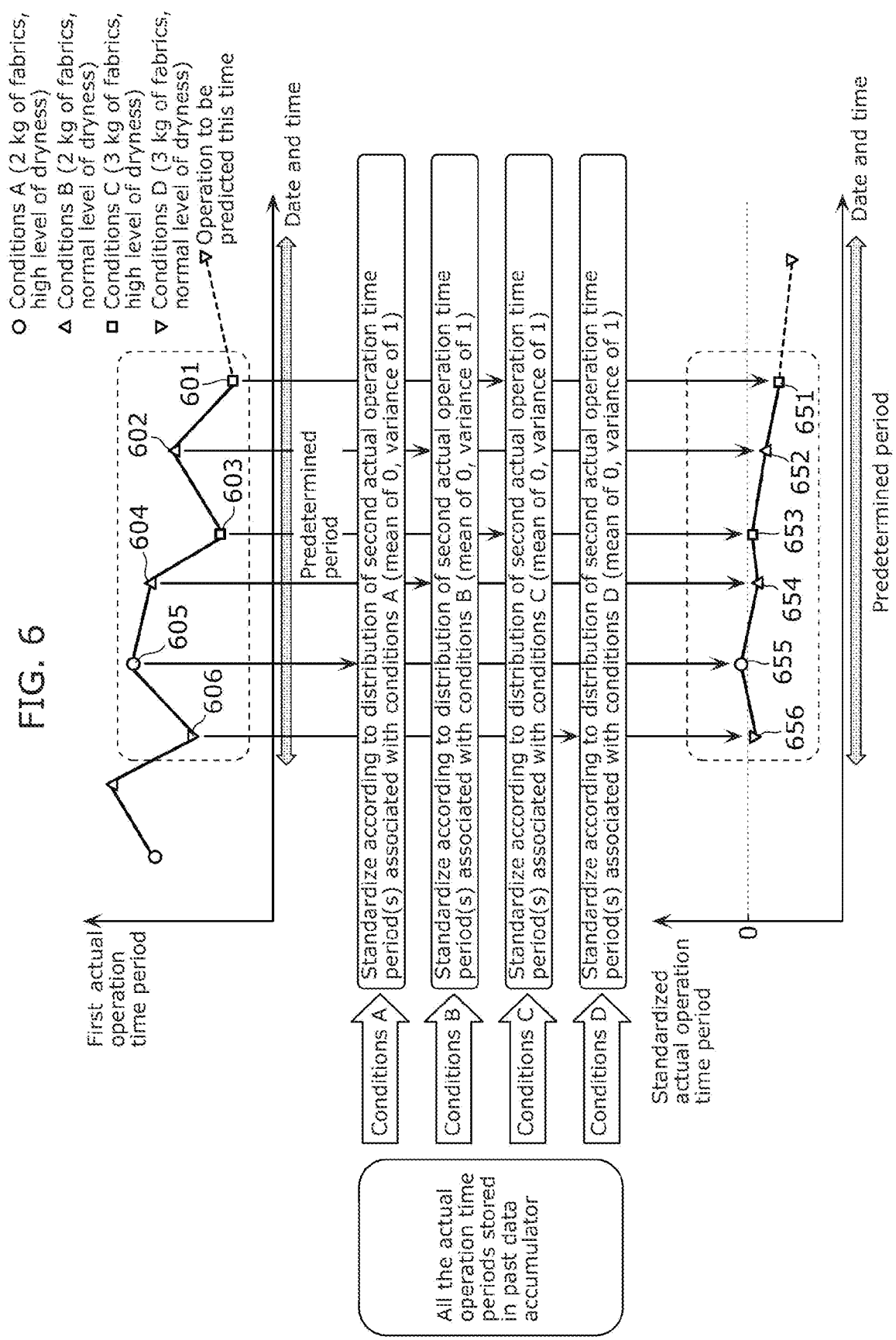
FIG. 6 schematically illustrates an example in which a standardization unit according to the embodiment calculates standardized actual operation time periods.

FIG. 6 schematically illustrates an example in which standardization unit 230 calculates standardized actual operation time periods.

The upper graph in FIG. 6 illustrates the first actual operation time periods of operations performed by first dryer 10. The horizontal axis denotes the date and time of each operation, and the vertical axis denotes the first actual operation time period. The lower graph in FIG. 6 illustrates standardized actual operation time periods calculated for the respective operations performed by first dryer 10. The horizontal axis denotes the date and time of each operation, and the vertical axis denotes the standardized actual operation time period.

In the upper graph, first actual operation time periods 601 to 606 are the first actual operation time periods of the operations performed by first dryer 10 during the predetermined period.

Here, first actual operation time period 605 is the actual operation time period of an operation performed under the actual operation conditions identical to operation conditions A (e.g., 2 kg of fabrics, an operation program for a high level of dryness). First actual operation time periods 602 and 604 are the actual operation time periods of operations performed under the actual operation conditions identical to operation conditions B (e.g., 2 kg of fabrics, an operation program for a normal level of dryness). First actual operation time periods 601 and 603 are the actual operation time periods of operations performed under the actual operation conditions identical to operations conditions C (e.g., 3 kg of fabrics, the operation program for a high level of dryness). First actual operation time period 606 is the actual operation time period of an operation performed under the actual operation conditions identical to operation conditions D (e.g., 3 kg of fabrics, the operation program for a normal level of dryness).

Standardization unit 230 standardizes first actual operation time period 605 according to the distribution of at least one second actual operation time period associated with the actual operation conditions identical to operation conditions A to calculate standardized actual operation time period 655. Standardization unit 230 standardizes each of first actual operation time periods 602 and 604 according to the distribution of at least one second actual operation time period associated with the actual operation conditions identical to operation conditions B to calculate standardized actual operation time periods 652 and 654. Standardization unit 230 standardizes each of first actual operation time periods 601 and 603 according to the distribution of at least one second actual operation time period associated with the actual operation conditions identical to operation conditions C to calculate standardized actual operation time periods 651 and 653. Standardization unit 230 standardizes first actual operation time period 606 according to the distribution of at least one second actual operation time period associated with the actual operation conditions identical to operation conditions D to calculate standardized actual operation time period 656.

In the example illustrated in FIG. 6, the values of standardized actual operation time periods 651 to 654 and standardized actual operation time period 656 are smaller than zero. Thus, each of first actual operation time periods 601 to 604 and first actual operation time period 606 tends to be shorter than the actual operation time periods of operations performed by all dryers 10 under the corresponding actual operation conditions. On the other hand, the value of standardized actual operation time period 606 is greater than zero. Thus, first actual operation time period 605 tends to be longer than the actual operation time periods of operations performed by all dryers 10 under the corresponding actual operation conditions.

Once again with reference to FIG. 5, a continued description of server device 20 is provided.

For instance, standardization unit 230 is caused to function by the processor of server device 20 running one or more programs stored in the memory of server device 20.

Representative value calculator 235 calculates the representative value of standardized actual operation time periods calculated by standardization unit 230. Here, the representative value of the standardized actual operation time periods means the representative value of at least one standardized actual operation time period.

Here, the representative value of the standardized actual operation time periods, calculated by representative value calculator 235 is described as the mean value of the standardized actual operation time periods. That is, in the description herein, representative value calculator 235 calculates the mean value of the standardized actual operation time periods calculated by standardization unit 230. However, the representative value of the standardized actual operation time periods, calculated by representative value calculator 235 does not necessarily have to be the mean value of the standardized actual operation time periods. For instance, the representative value of the standardized actual operation time periods, calculated by representative value calculator 235 may be the maximum, minimum, median, or mode (most frequent) value of the standardized actual operation time periods.

The mean value of the standardized actual operation time periods, calculated by representative value calculator 235 reflects whether the actual operation time periods of operations performed by first dryer 10 under all the actual operation conditions during the past predetermined period tend to be longer or shorter.

For instance, representative value calculator 235 is caused to function by the processor of server device 20 running one or more programs stored in the memory of server device 20.

Learned model 245 is a machine learning model pre-trained to output operation finish time information in response to input of operation conditions, sensing information, the mean value of standardized actual operation time periods, the operation finish time information being related to the operation finish time of an operation started under the operation conditions. Here, the operation finish time information is described as the remaining drying time until the end of the operation started under the operation conditions.

For instance, learned model 245 is created by a neural network built on server device 20 by the processor of server device 20 running one or more programs stored in the memory of server device 20.

Learned model 245 is created by, for example, training a machine learning model by using, as input data, operation conditions, sensing information, and the mean value of standardized actual operation time periods and, as labeled data, remaining drying time periods pre-created according to actual values obtained through actual operation of dryer 10.

Predictor 240 obtains the operation finish time information from learned model 245 by inputting, to learned model 245, the operation conditions obtained by operation condition obtainment unit 215, the sensing information obtained by sensing information obtainment unit 210, and the mean value calculated by representative value calculator 235. More specifically, every time sensing information obtainment unit 210 obtains sensing information, predictor 240 inputs the operation conditions, the sensing information, and the mean value to learned model 245 to obtain operation finish time information from learned model 245.

Then, every time predictor 240 obtains operation finish time information, predictor 240 calculates, according to the obtained operation finish time information, first information indicating the remaining drying time of the operation being performed by first dryer 10 to dry clothes and other items.

For instance, predictor 240 is caused to function by the processor of server device 20 running one or more programs stored in the memory of server device 20.

Outputting unit 250 outputs the first information calculated by predictor 240 to first dryer 10 and smartphone 30 associated with first dryer 10 via communication unit 200. More specifically, every time predictor 240 calculates first information, outputting unit 250 transmits the first information to first dryer 10 and smartphone 30 associated with first dryer 10 via communication unit 200.

For instance, outputting unit 250 is caused to function by the processor of server device 20 running one or more programs stored in the memory of server device 20.

Figure 7:
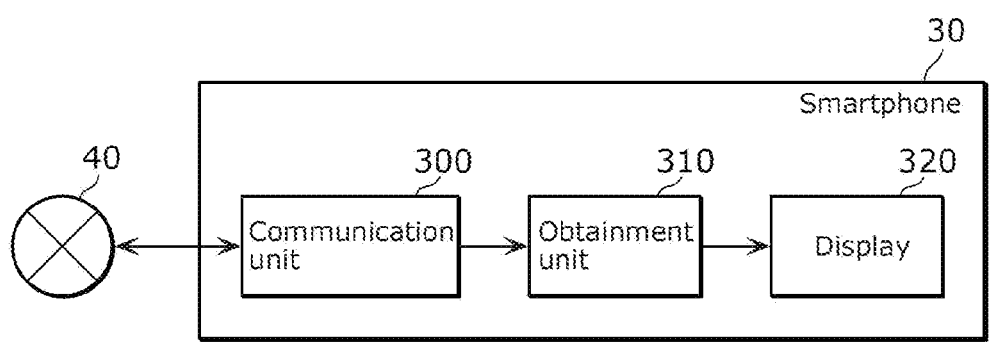
FIG. 7 is a block diagram illustrating a configuration example of a smartphone according to the embodiment.

FIG. 7 is a block diagram illustrating a configuration example of smartphone 30.

Smartphone 30 is connected to network 40 and associated with at least one of dryers 10 and has the function of displaying information transmitted by server device 20.

As illustrated in FIG. 7, smartphone 30 includes communication unit 300, obtainment unit 310, and display 320.

Communication unit 300 is connected to network 40 and communicates with external devices connected to network 40, via network 40. The external devices include dryers 10 and server device 20.

For instance, communication unit 300 includes an input-output interface (not illustrated) and is caused to function by the processor (not illustrated) of smartphone 30 running one or more programs stored in the memory (not illustrated) of smartphone 30 to control the input-output interface.

Obtainment unit 310 obtains first information from server device 20 via communication unit 300. More specifically, every time server device 20 transmits first information, obtainment unit 310 obtains the first information.

For instance, obtainment unit 310 is caused to function by the processor of smartphone 30 running one or more programs stored in the memory of smartphone 30.

Display 320 displays information on the first information obtained by obtainment unit 310. More specifically, every time obtainment unit 310 obtains first information, display 320 displays remaining drying time indicated by the first information.

For instance, display 320 includes a touch panel (not illustrated) and is caused to function by the processor of smartphone 30 running one or more programs stored in the memory of smartphone 30 to control the touch panel.

[2. Operation]

Hereinafter, operation of drying time prediction system 1 having the above configuration is described.

Drying time prediction system 1 implements drying time prediction processing for predicting the drying time of a drying operation being performed by first dryer 10 to dry clothes and other items put in first dryer 10.

Figure 8:
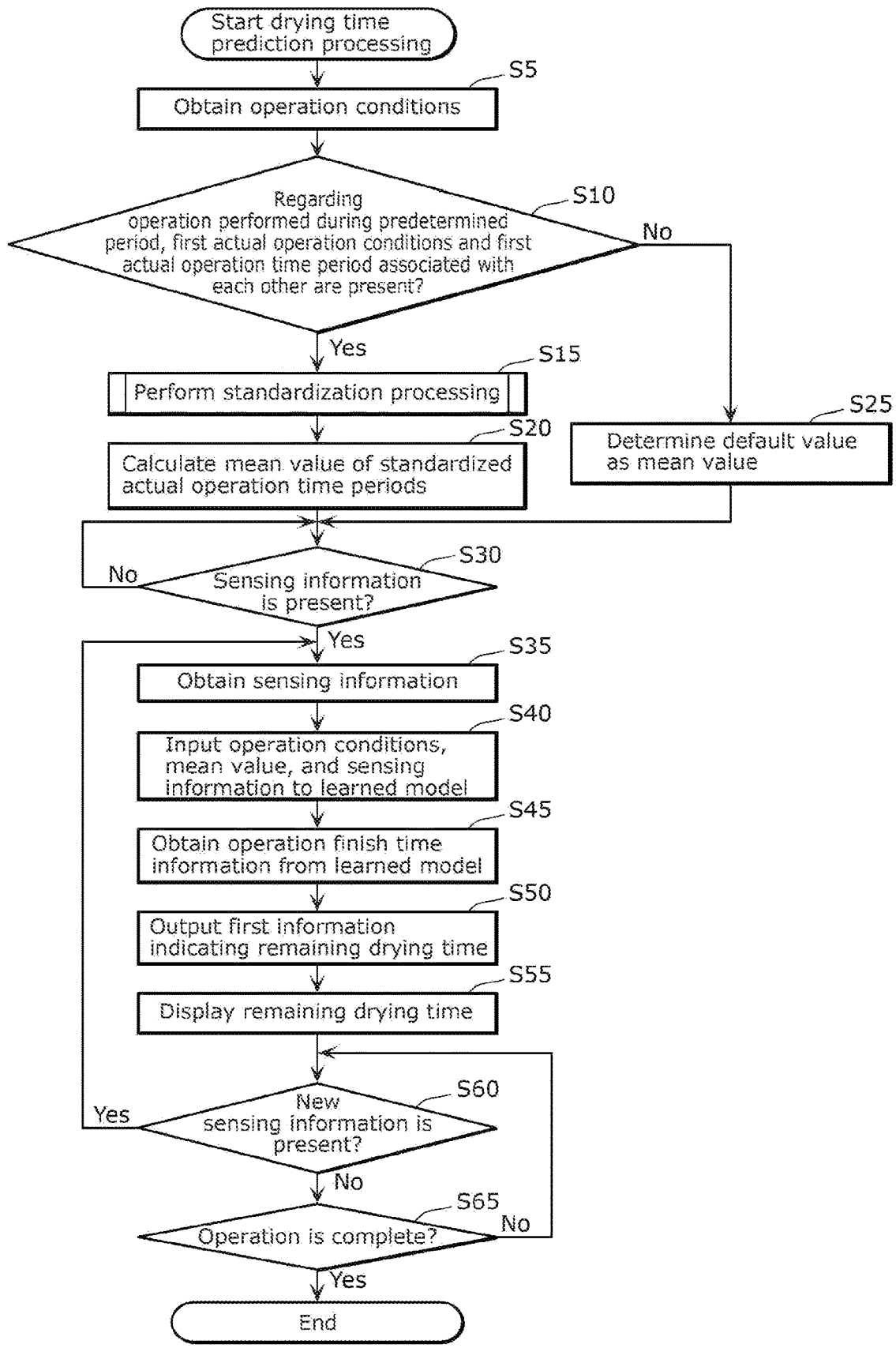
FIG. 8 is a flowchart illustrating drying time prediction processing according to the embodiment.

FIG. 8 is a flowchart illustrating the drying time prediction processing.

The drying time prediction processing is started by first dryer 10 starting a drying operation.

When first dryer 10 starts a drying operation, provision unit 160 of first dryer 10 provides server device 20 with operation conditions received by input receiving unit 110 of first dryer 10. Operation condition obtainment unit 215 then obtains the operation conditions (step S5).

When operation condition obtainment unit 215 obtains the operation conditions, first actual operation time period obtainment unit 220 checks whether there are pairs each including first actual operation conditions and a first actual operation time period associated with each other for operations performed by first dryer 10 during a past predetermined period among pairs each including actual operation conditions and an actual operation time period associated with each other that are stored in past data accumulator 205 (step S10).

In step S10, if there are one or more applicable pairs each including first actual operation conditions and a first actual operation time period (Yes in step S10), drying time prediction system 1 implements standardization processing for each first actual operation time period to standardize the first actual operation time period according to the distribution of at least one second actual operation time period associated with second actual operation conditions corresponding to first actual operation conditions associated with the first actual operation time period (step S15).

Figure 9:
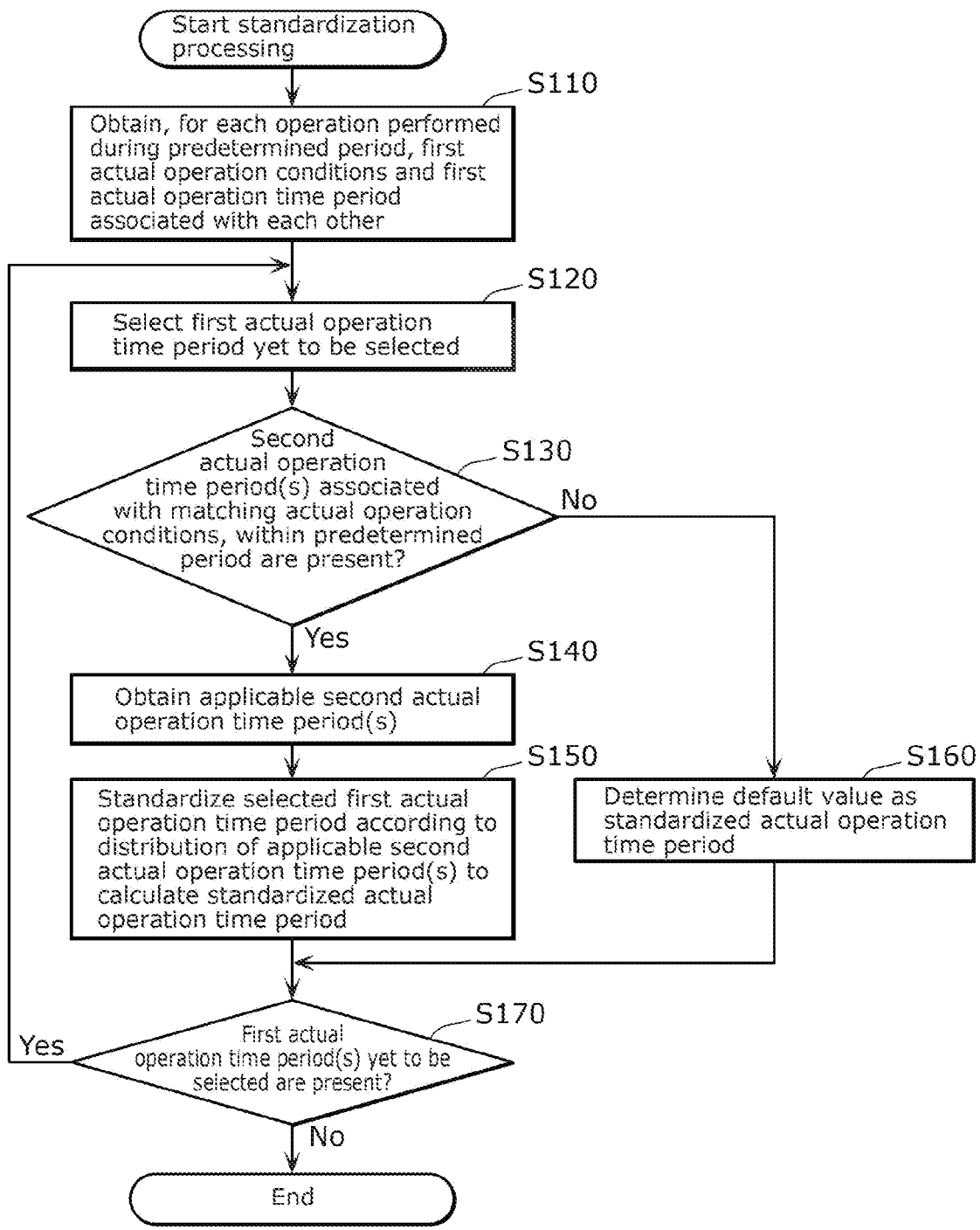
FIG. 9 is a flowchart illustrating standardization processing according to the embodiment.

FIG. 9 is a flowchart illustrating the standardization processing.

When the standardization processing is started, first actual operation time period obtainment unit 220 obtains first actual operation conditions and a first actual operation time period associated with each other for each operation performed by first dryer 10 during the past predetermined period from among the pairs each including actual operation conditions and an actual operation time period associated with each other that are stored in past data accumulator 205 (step S110). In addition, second actual operation time period obtainment unit 225 obtains second actual operation conditions and a second actual operation time period associated with each other for each operation performed by at least one second dryer 10 during the past predetermined period from among the pairs each including actual operation conditions and an actual operation time period associated with each other that are stored in past data accumulator 205.

After step S110 is complete, or if in step S170, which is described later, there are one or more first actual operation time periods yet to be selected (Yes in step S170), first actual operation time period obtainment unit 220 selects a first actual operation time period yet to be selected (step S120). Here, the one or more first actual operation time periods yet to be selected are one or more first actual operation time periods yet to be selected in the loop processing created by selecting Yes in steps S120 to S170, among the first actual operation time periods obtained in step S110.

When a first actual operation time period yet to be selected is selected, standardization unit 230 checks whether there are second actual operation time periods associated with second actual operation conditions corresponding to first actual operation conditions associated with the selected first actual operation time period, among the second actual operation time periods obtained by second actual operation time period obtainment unit 225 (step S130).

In step S130, if there is at least one applicable second actual operation time period (Yes in step S130), standardization unit 230 obtains the at least one applicable second actual operation time period (step S140) and standardizes the selected first actual operation time period according to the distribution of the at least one applicable second actual operation time period to calculate a standardized actual operation time period (step S150).

In step S130, if there are no applicable second actual operation time periods (No in step S130), standardization unit 230 determines a predetermined default value as a standardized actual operation time period (step S160).

After step S150 or S160 is complete, first actual operation time period obtainment unit 220 checks whether there are first actual operation time periods yet to be selected (step S170).

In step S170, if there are one or more first actual operation time periods yet to be selected (Yes in step S170), the processing of drying time prediction system 1 returns to step S120.

In step S170, if there are no first actual operation time periods yet to be selected (No in step S170), drying time prediction system 1 ends the standardization processing.

Once again with reference to FIG. 8, a continued description of the drying time prediction processing is provided.

After the standardization processing is complete, representative value calculator 235 calculates the mean value of standardized actual operation time periods calculated in the standardization processing (step S20).

In step S10, if there are no applicable pairs each including first actual operation conditions and a first actual operation time period (No in step S10), representative value calculator 235 determines a predetermined default value as the mean value (step S25).

After step S20 or S25 is complete, sensing information obtainment unit 210 checks whether sensing information has been received from provision unit 160 of first dryer 10 (step S30).

In step S30, if sensing information is not provided (No in step S30), sensing information obtainment unit 210 waits for sensing information to be provided (No is repeated in step S30).

In step S30, if sensing information is provided (Yes in step S30) or if new sensing information is provided in step S60, which is described later (Yes in step S60), sensing information obtainment unit 210 obtains the sensing information (step S35).

When sensing information obtainment unit 210 obtains the sensing information, predictor 240 inputs, to learned model 245, the operation conditions obtained in step S5, the mean value calculated in step S20, and the sensing information obtained in step S35 (step S40) to obtain operation finish time information from learned model 245 (step S45).

When obtaining the operation finish time information, predictor 240 calculates first information indicating the remaining drying time of the operation being performed by first dryer 10 to dry clothes and other items. Outputting unit 250 then outputs the first information indicating the remaining drying time to first dryer 10 and smartphone 30 associated with first dryer 10 (step S50).

When outputting unit 250 outputs the first information, obtainment unit 170 of first dryer 10 obtains the first information, and display 180 of first dryer 10 displays the remaining drying time indicated by the first information (step S55). In addition, obtainment unit 310 of smartphone 30 associated with first dryer 10 obtains the first information, and display 320 of smartphone 30 associated with first dryer 10 displays the remaining drying time indicated by the first information.

Meanwhile, sensing information obtainment unit 210 checks whether new sensing information has been received from provision unit 160 of first dryer 10 (step S60).

In step S60, if new sensing information is not provided (No in step S60), unless the operation of first dryer 10 is complete (No in step S65), sensing information obtainment unit 210 waits for new sensing information to be provided (No is repeated in step 60 and in step S65).

In step S60, if new sensing information is provided (Yes in step S60), the processing of drying time prediction system 1 returns to step S35.

While waiting for new sensing information to be provided, if the operation of first dryer 10 is complete (Yes in step S65), drying time prediction system 1 ends the drying time prediction processing.

[3. Discussion]

As illustrated in the upper graph in FIG. 6, in many cases, operations performed by first dryer 10 during a past predetermined period are operations performed under various actual operation conditions. In addition, the actual operation time periods of operations started under different actual operation conditions usually vary. Thus, just calculating the mean value of the actual operation time periods of operations performed by first dryer 10 during a past predetermined period may not be enough in order for the mean value to sufficiently reflect whether the operations performed by first dryer 10 during the past predetermined period tend to take longer or shorter.

In addition, as illustrated in the upper graph in FIG. 6, the number of operations performed by first dryer 10 under particular actual operation conditions during a past predetermined period is usually limited. Thus, the statistically effective number of operations may not be performed. That is, just calculating the mean value of the actual operation time periods of the operations performed by first dryer 10 under the particular actual operation conditions during the past predetermined period may not be enough for the mean value to sufficiently reflect whether the operations performed by first dryer 10 during the past predetermined period tend to take longer or shorter.

In contrast, in drying time prediction system 1 having the above configuration, as described above, the mean value of standardized actual operation time periods, calculated by representative value calculator 235 reflects whether the actual operation time periods of operations performed by first dryer 10 under all the actual operation conditions during a past predetermined period tend to be longer or shorter.

Accordingly, drying time prediction system 1 can predict drying time more accurately than conventional methods.

(Supplement)

Thus, the drying time prediction system according to one aspect of the present disclosure is described on the basis of the embodiment. However, the present disclosure is not limited to the description in the embodiment. One or more embodiments of the present disclosure may include an embodiment obtained by making various changes envisioned by those skilled in the art to the embodiment and an embodiment obtained by combining structural elements described in different embodiments unless such embodiments do not depart from the scope of the present disclosure.

(1) In the embodiment, server device 20 includes predictor 240. However, as long as it is possible to obtain a function similar to that of drying time prediction system 1, server device 20 does not necessarily include predictor 240. For instance, one of dryers 10 or one of smartphones 30 may include predictor 240.

Likewise, as long as it is possible to obtain a function similar to that of drying time prediction system 1, for instance, at least one of dryers 10 or at least one of smartphones 30 may include at least a part of the structural elements of server device 20. In addition, for instance, server device 20 or at least one of smartphones 30 may include at least a part of the structural elements of dryer 10. Furthermore, for instance, server device 20 or at least one of dryers 10 may include at least a part of the structural elements of smartphone 30.

(2) In the embodiment, drying time prediction system 1 includes dryers 10. In contrast, in another configuration example, dryers 10 may be external devices for drying time prediction system 1. In this case, each of dryers 10 provides drying time prediction system 1 with operation conditions received by input receiving unit 110, pairs each including actual operation conditions and an actual operation time period associated with each other that are stored in past data accumulator 140, and sensing information obtained by sensing unit 150 to obtain first information indicating remaining drying time from drying time prediction system 1.

(3) In the embodiment, drying time prediction system 1 includes smartphones 30. However, smartphones 30 do not necessarily have to be the essential structural elements of drying time prediction system 1. In another configuration example, drying time prediction system 1 may not include smartphones 30.

(4) In the embodiment, learned model 245 is a machine learning model pre-trained to output operation finish time information in response to input of operation conditions, sensing information, and the mean value of standardized actual operation time periods, the operation finish time information being related to the finish time of an operation started under the operation conditions. In contrast, in another configuration example, learned model 245 may be a machine learning model pre-trained to output operation finish time information in response to input of operation conditions, sensing information, and standardized actual operation time periods, the operation finish time information being related to the finish time of an operation started under the operation conditions. In this case, predictor 240 obtains the operation finish time information from learned model 245 by inputting, to learned model 245, the operation conditions obtained by operation condition obtainment unit 215, the sensing information obtained by sensing information obtainment unit 210, and the standardized actual operation time periods calculated by standardization unit 230. In still another configuration example, learned model 245 may be a machine learning model pre-trained to output operation finish time information in response to input of operation conditions and standardized actual operation time periods, the operation finish time information being related to the finish time of an operation started under the operation conditions. In this case, predictor 240 obtains the operation finish time information from learned model 245 by inputting, to learned model 245, the operation conditions obtained by operation condition obtainment unit 215 and the standardized actual operation time periods calculated by standardization unit 230.

(5) In the embodiment, predictor 240 includes one learned model 245. In contrast, in another configuration example, predictor 240 may include learned models 245. For instance, predictor 240 may include pre-trained learned models 245 appropriate to the elapsed time since the start of operation of dryer 10. In this case, predictor 240 selects appropriate learned model 245 according to the elapsed time since the start of operation of first dryer 10 from among learned models 245 and inputs, to selected learned model 245, operation conditions obtained by operation condition obtainment unit 215, sensing information obtained by sensing information obtainment unit 210, and a mean value calculated by representative value calculator 235. In this manner, predictor 240 obtains operation finish time information from selected learned model 245.

(6) The present disclosure can be embodied not only as a system or a device but also as a method including, as steps, processing performed by the elements of the system or the device, a program run by a computer to implement the steps, a computer-readable recording medium storing the program, such as CD-ROM, or information, data, or a signal indicating the program. The program, information, data, and signal may be distributed via a communication network, such as the Internet.

INDUSTRIAL APPLICABILITY

The present disclosure can be widely used in, for example, a system and a device for predicting drying time.

The invention claimed is:

1. A drying time prediction method comprising:
obtaining an operation condition set at start of an operation of a first dryer;
obtaining a first actual operation time period of each of at least one first operation performed by the first dryer;
obtaining operation finish time information from a learned model by inputting, to the learned model, the operation condition and first actual information that is based on the first actual operation time period, the operation finish time information being related to a finish time of the operation started under the operation condition;
outputting first information based on the operation finish time information, wherein the first information indicates a remaining drying time period;
obtaining, for each of the at least one first operation, a first actual operation condition set at start of the first operation, the first actual operation condition being associated with the first actual operation time period of the first operation;
obtaining, for each of at least one second operation that has been performed by at least one second dryer, a second actual operation time period of the second operation and a second actual operation condition set at start of the second operation, the second actual operation condition being associated with the second actual operation time period of the second operation;
calculating a standardized actual operation time period for each of at least one first actual operation time period obtained in the obtaining of the first actual operation time period, by standardizing each of the at least one first actual operation time period according to a distribution of at least one second actual operation time period associated with the second actual operation condition corresponding to the first actual operation condition associated with the first actual operation time period, the at least one second actual operation time period being included in at least one second actual operation time period of the at least one second operation; and
calculating a mean value of the at least one standardized actual operation time period calculated for the at least one first actual operation time period,
wherein the first actual information is based on the mean value.

2. The drying time prediction method according to claim 1 further comprising:
obtaining sensing information on a state of the first dryer performing the operation started under the operation condition,
wherein the obtaining of the operation finish time information includes obtaining the operation finish time information from the learned model by inputting the sensing information to the learned model in addition to the operation condition and the first actual information.

3. The drying time prediction method according to claim 1, wherein the first operation is an operation performed by the first dryer during a past predetermined period, and
the second operation is an operation performed by the at least one second dryer during the past predetermined period.

4. The drying time prediction method according to claim 1,
wherein the operation condition and the first actual operation condition each include a fabric amount of items put in the first dryer and an operation program of the first dryer that have been set by a user of the first dryer, and
the second actual operation condition incudes a fabric amount of items put in each of the at least one second dryer and an operation program of the second dryer that have been set by a user of the second dryer.

5. The drying time prediction method according to claim 1,
wherein the first dryer and the at least one second dryer are same type of dryers.

6. The drying time prediction method according to claim 1, wherein
the learned model is a model created by training a machine learning model by using, as input data, the operation condition and the first actual information and, as labeled data, a remaining drying time period pre-created according to an actual value obtained through an actual operation of the first dryer.

7. A drying time prediction system comprising:
a first memory; and
a first processor coupled to the first memory and configured to perform operations comprising:
obtaining an operation condition set at start of an operation of a first dryer;
obtaining a first actual operation time period of each of at least one first operation performed by the first dryer;
obtaining operation finish time information output by a learned model in response to input of the operation condition and first actual information that is based on the first actual operation time period, the operation finish time information being related to a finish time of the operation started under the operation condition;

outputting first information based on the operation finish time information, wherein the first information indicates a remaining drying time period;

obtaining, for each of the at least one first operation, a first actual operation condition set at start of the first operation, the first actual operation condition being associated with the first actual operation time period of the first operation;

obtaining, for each of at least one second operation that has been performed by at least one second dryer, a second actual operation time period of the second operation and a second actual operation condition set at start of the second operation, the second actual operation condition being associated with the second actual operation time period of the second operation;

calculating a standardized actual operation time period for each of at least one first actual operation time period obtained in the obtaining of the first actual operation time period, by standardizing each of the at least one first actual operation time period according to a distribution of at least one second actual operation time period associated with the second actual operation condition corresponding to the first actual operation condition associated with the first actual operation time period, the at least one second actual operation time period being included in at least one second actual operation time period of the at least one second operation; and calculating a mean value of the at least one standardized actual operation time period calculated for the at least one first actual operation time period, wherein the first actual information is based on the mean value.

8. A dryer that is the first dryer using the drying time prediction system according to claim 7, the dryer comprising:

a display;

a second memory; and a second processor coupled to the second memory and configured to perform operations comprising:

providing the drying time prediction system with the operation condition and the first actual operation time period;

obtaining the first information from the drying time prediction system; and displaying information on the first information on the display.

9. The drying time prediction system according to claim 7, wherein the learned model is a model created by training a machine learning model by using, as input data, the operation condition and the first actual information and, as labeled data, a remaining drying time period pre-created according to an actual value obtained through an actual operation of the first dryer.

* * * * *